(12) United States Patent
Niewiadomski et al.

(10) Patent No.: US 10,802,478 B2
(45) Date of Patent: Oct. 13, 2020

(54) HITCH ASSIST SYSTEM AND METHOD FOR AUTONOMOUSLY MANEUVERING A VEHICLE IN A USER-SPECIFIED TARGET TRAVEL DIRECTION

(71) Applicant: Ford Global Technologies, LLC, Dearborn, MI (US)

(72) Inventors: Luke Niewiadomski, Hamtramck, MI (US); Roger Arnold Trombley, Ann Arbor, MI (US); Dongran Liu, San Jose, CA (US); Yi Zhang, Sunnyvale, CA (US); Douglas Rogan, Detroit, MI (US); Chen Zhang, Canton, MI (US); Shannon Brooks-Lehnert, Ann Arbor, MI (US); Vidya Nariyambut murali, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 265 days.

(21) Appl. No.: 15/787,809

(22) Filed: Oct. 19, 2017

(65) Prior Publication Data

US 2019/0121351 A1  Apr. 25, 2019

(51) Int. Cl.
| | |
|---|---|
| *G05D 1/00* | (2006.01) |
| *B60D 1/36* | (2006.01) |
| *B62D 6/00* | (2006.01) |
| *B60R 1/00* | (2006.01) |
| *G05D 1/02* | (2020.01) |
| *G06F 3/0488* | (2013.01) |

(52) U.S. Cl.
CPC ............ *G05D 1/0016* (2013.01); *B60D 1/36* (2013.01); *B60R 1/003* (2013.01); *B62D 6/002* (2013.01); *B62D 6/007* (2013.01); *G05D 1/0038* (2013.01); *G05D 1/0088* (2013.01); *G05D 1/0225* (2013.01); *G06F 3/04886* (2013.01); *G05D 1/0248* (2013.01); *G05D 1/0255* (2013.01); *G05D 1/0257* (2013.01); *G05D 2201/0213* (2013.01)

(58) Field of Classification Search
CPC .. G05D 1/0016; G05D 1/0038; G05D 1/0088; G05D 1/0225; G05D 1/0248; G05D 1/0255; G05D 1/0257; G05D 2201/0213; G06F 3/04886; B60D 1/36; B60R 1/003; B62D 6/002; B62D 6/007
See application file for complete search history.

(56) References Cited

U.S. PATENT DOCUMENTS

| | | | | |
|---|---|---|---|---|
| 6,765,607 | B2 * | 7/2004 | Mizusawa et al. | B60D 1/36 348/118 |
| 7,739,015 | B2 | 6/2010 | Senneff et al. | |
| 8,619,041 | B2 * | 12/2013 | Griffin et al. | G06F 3/04886 345/173 |

(Continued)

*Primary Examiner* — Dale W Hilgendorf
(74) *Attorney, Agent, or Firm* — Raymond Coppiellie; Price Heneveld LLP (57) ABSTRACT

A hitch assist system and method are provided herein. A human machine interface is configured to receive user-input specifying a target travel direction of a vehicle. A controller is configured to generate commands for autonomously maneuvering the vehicle in the target travel direction, identify a hitch coupler of a trailer based on input received from an object detection system, and request additional user-input updating the target travel direction if the hitch coupler is unable to be identified.

20 Claims, 6 Drawing Sheets

(56) References Cited

U.S. PATENT DOCUMENTS

| | | |
|---|---|---|
| 9,140,553 B2 | 9/2015 | Grimm et al. |
| 9,403,413 B2 * | 8/2016 | Talty et al. ............... B60D 1/36 |
| 9,499,018 B2 * | 11/2016 | Gehrke et al. ............ B60D 1/36 |
| 10,214,062 B2 * | 2/2019 | Huger et al. .............. B60D 1/36 |
| 2005/0074143 A1 * | 4/2005 | Kawai ...................... B60D 1/36 |
| | | 701/300 |
| 2008/0180526 A1 * | 7/2008 | Trevino ................... B60D 1/36 |
| | | 348/148 |
| 2011/0001614 A1 * | 1/2011 | Ghneim ................... B60D 1/36 |
| | | 340/435 |
| 2011/0216199 A1 * | 9/2011 | Trevino et al. .......... B60D 1/36 |
| | | 348/148 |
| 2012/0283909 A1 | 11/2012 | Dix |
| 2016/0052548 A1 * | 2/2016 | Singh et al. ............. B60D 1/36 |
| | | 701/37 |
| 2016/0304122 A1 * | 10/2016 | Herzog et al. ........... B60D 1/36 |
| 2016/0378118 A1 * | 12/2016 | Zeng et al. .............. B60D 1/36 |
| | | 701/28 |
| 2018/0029429 A1 * | 2/2018 | Janardhana et al. ..... B60D 1/36 |
| 2018/0181142 A1 * | 6/2018 | Baran ....................... B60D 1/36 |

\* cited by examiner

HITCH ASSIST SYSTEM AND METHOD FOR AUTONOMOUSLY MANEUVERING A VEHICLE IN A USER-SPECIFIED TARGET TRAVEL DIRECTION

FIELD OF THE INVENTION

The present invention generally relates to hitch assist systems of a vehicle, and more particularly, to hitch assist systems capable of autonomously maneuvering a vehicle toward a trailer.

BACKGROUND OF THE INVENTION

Reversing a vehicle toward a trailer in order to attach a tow hitch to a hitch coupler can be challenging for many drivers, particularly those who are unfamiliar with trailers and the hitching process in general. Accordingly, there is a need for a system that assists a driver in navigating a vehicle toward the trailer such that a hitch connection can be made therebetween. The present disclosure is intended to satisfy this need.

SUMMARY OF THE INVENTION

According to a first aspect of the present invention, a hitch assist system is provided. A human machine interface is configured to receive user-input specifying a target travel direction of a vehicle. A controller is configured to generate commands for autonomously maneuvering the vehicle in the target travel direction, identify a hitch coupler of a trailer based on input received from an object detection system, and request additional user-input updating the target travel direction if the hitch coupler is unable to be identified.

Embodiments of the first aspect of the invention can include any one or a combination of the following features:
- the human machine interface includes a touchscreen display configured to display a rear-vehicle view and register one or more touch events thereon for specifying the target travel direction of the vehicle;
- the touchscreen display generates an overlay once the target travel direction is specified and the controller generates commands for autonomously maneuvering the vehicle in the target travel direction based on a touch event on the overlay;
- the touch event includes touching the overlay and maintaining touch therewith;
- the object detection system includes at least one of a rear-vehicle camera and one or more proximity sensors comprising at least one of an ultrasonic sensor, a radar sensor, a laser sensor, and a LIDAR sensor;
- the controller generates commands for stopping the vehicle if a pause condition is satisfied;
- the pause condition is satisfied if the vehicle reaches an end position in the target travel direction;
- the pause condition is satisfied if the vehicle travels a predetermined maximum distance in the target travel direction;
- the pause condition is satisfied if the detection system detects an object located at a predetermined distance rearward from the vehicle;
- upon identifying the hitch coupler, the controller updates the target travel direction of the vehicle and generates commands for autonomously maneuvering the vehicle toward the hitch coupler in order to align a tow hitch of the vehicle therewith;
- prior to updating the target travel direction of the vehicle, the controller requests user-input confirming the identification of the hitch coupler; and
- the additional user-input updating the target travel direction includes user-input specifying a new target travel direction or user-input confirming a current target travel direction.

According to a second aspect of the present invention, a hitch assist system of a vehicle is provided. A touchscreen display is configured to display a rear-vehicle view and register one or more touch events thereon for specifying the target travel direction of the vehicle. The one or more touch events includes touching a point on the touchscreen display. A controller is configured to translate the point into a real world coordinate and generate commands for autonomously maneuvering the vehicle in the target travel direction toward the real world coordinate of a touchpoint.

Embodiments of the second aspect of the invention can include any one or a combination of the following features:
- the touchscreen display is configured to generate a touch zone indicating an allowable area in which to perform a touch event for specifying the target travel direction;
- the touch zone is generated on a lower central region of the touchscreen display where an imaged trailer is predictably found;
- the touchscreen display generates an overlay encompassing the touchpoint and the controller generates commands for autonomously maneuvering the vehicle in the target travel direction based on a touch event on the overlay;
- the touch event includes touching the overlay and maintaining touch therewith;
- so long as touch is maintained with the overlay, the controller continues to generate commands for autonomously maneuvering the vehicle in the target travel direction; and
- the controller generates commands for stopping the vehicle if a pause condition is satisfied, and wherein the pause condition is satisfied if the vehicle reaches an end position in the target travel direction, the vehicle travels a predetermined maximum distance in the target travel direction, or an object is detected at a predetermined distance rearward from the vehicle.

According to a third aspect of the present invention, a method is provided and includes the steps of providing a human machine interface for receiving user-input specifying a target travel direction of a vehicle, generating commands for autonomously maneuvering the vehicle in the target travel direction, identifying a hitch coupler of a trailer based on input received from an object detection system, and requesting additional user-input updating the target travel direction if the hitch coupler is unable to be identified.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
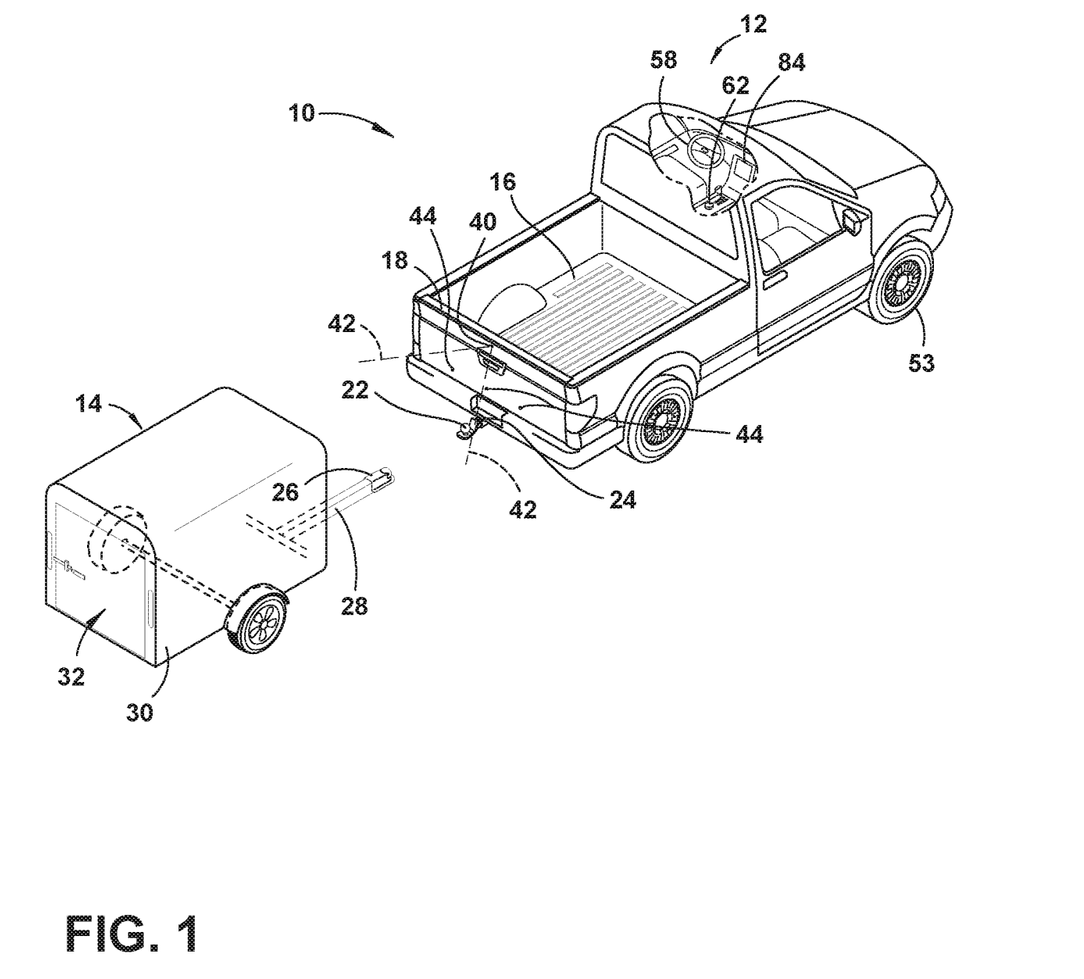
FIG. 1 is a top perspective view of a vehicle and a trailer, the vehicle being equipped with a hitch assist system according to one embodiment.
Figure 2:
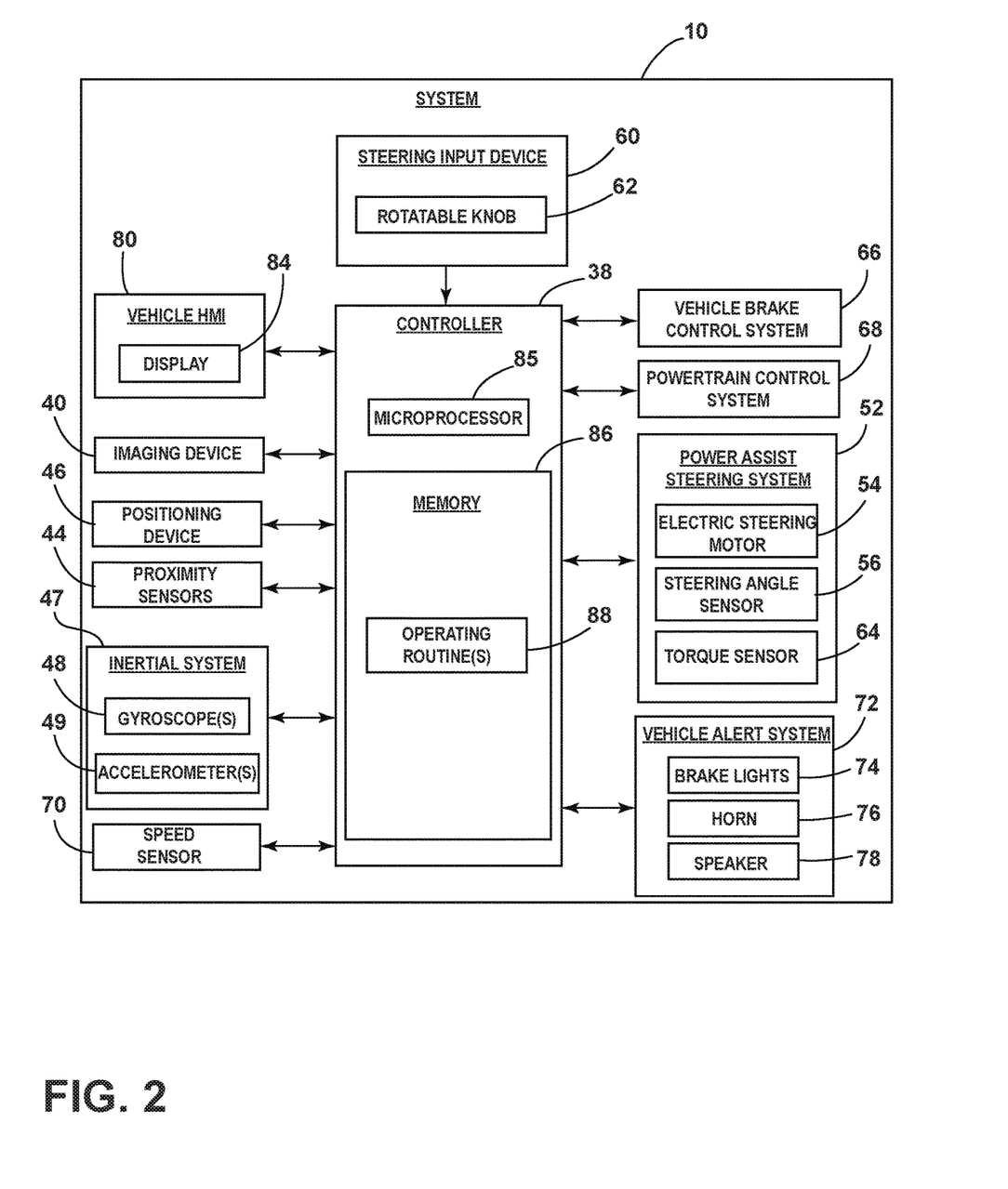
FIG. 2 is a block diagram illustrating the hitch assist system.

Referring to FIGS. 1 and 2, reference numeral 10 generally designates a hitch assist system for hitching a vehicle 12 to a trailer 14. As shown in FIG. 1, the vehicle 12 is exemplarily embodied as a pickup truck having a truck bed 16 that is accessible via a fold-down tailgate 18. The vehicle 12 also includes a tow hitch in the form of a hitch ball 22 extending from a drawbar 24 that is coupled to the rear of the vehicle 12. The hitch ball 22 is configured to be received by a hitch coupler in the form of a coupler ball socket 26 that is provided at a terminal end of a trailer tongue 28. The trailer 14 is exemplarily embodied as a single axle trailer having a box frame 30 with an enclosed cargo area 32 from which the tongue 28 extends longitudinally.

The system 10 includes a controller 38 in communication with an imaging device 40 (e.g., a camera) located at the rear of the vehicle 12. The imaging device 40 may be centrally located at an upper region of the tailgate 18 such that the imaging device 40 is elevated relative to the drawbar 24 and the hitch ball 22. The imaging device 40 has a field of view 42 located and oriented to capture one or more images of a rear-vehicle scene that generally includes the hitch ball 22, among other things. Images captured by the imaging device 40 may be processed by the controller 38 to identify a hitch coupler such as the coupler ball socket 26. It is contemplated that the coupler ball socket 26 may be identified using any known imaging techniques.

In addition to communicating with the imaging device 40, the controller 38 may communicate with a number of proximity sensors 44 spaced across a lower region of the vehicle tailgate 18 and configured to detect objects located rearward of the vehicle 12. The proximity sensors 44 may include ultrasonic, radar, laser and/or LIDAR sensors. With reference to the embodiment of the system 10 shown in FIG. 2, additional vehicle-related information may be provided to the controller 38 by a positioning device 46, such as a global positioning system (GPS) located on the vehicle 12 and/or the trailer 14. Additionally, the controller 38 may communicate with an inertial system 47 including one or more gyroscopes 48 and accelerometers 49 to measure the position, orientation, direction, and/or speed of the vehicle 12.

To enable autonomous or semi-autonomous control of the vehicle 12, the controller 38 of system 10 may be further configured to communicate with a variety of vehicle equipment. According to one embodiment, the controller 38 of the system 10 may control a power assist steering system 52 of the vehicle 12 to operate the steered wheels 53 of the vehicle 12 while the vehicle 12 is reversed toward the trailer 14 along a vehicle backup path. The power assist steering system 52 may be an electric power-assisted steering (EPAS) system that includes an electric steering motor 54 for turning the steered wheels 53 to a steering angle based on a steering command generated by the controller 38, whereby the steering angle may be sensed by a steering angle sensor 56 of the power assist steering system 52 and provided to the controller 38. As described herein, the steering command may be provided for autonomously steering the vehicle 12 during a backup maneuver and may alternatively be provided manually via a rotational position (e.g., a steering wheel angle) of a steering wheel 58 or a steering input device 60, which may be provided to enable a driver to control or otherwise modify the desired curvature of the backing path of vehicle 12. The steering input device 60 may be communicatively coupled to the controller 38 in a wired or wireless manner and provides the controller 38 with information defining the desired curvature of the backing path of the vehicle 12. In response, the controller 38 processes the information and generates corresponding steering commands that are supplied to the power assist steering system 52 of the vehicle 12. In one embodiment, the steering input device 60 includes a rotatable knob 62 operable between a number of rotated positions that each provide an incremental change to the desired curvature of the backing path of the vehicle 12.

In some embodiments, the steering wheel 58 of the vehicle 12 may be mechanically coupled with the steered wheels 53 of the vehicle 12, such that the steering wheel 58 moves in concert with steered wheels 53 via an internal torque, thereby preventing manual intervention with the steering wheel 58 during autonomous steering of the vehicle 12. In such instances, the power assist steering system 52 may include a torque sensor 64 that senses torque (e.g., gripping and/or turning) on the steering wheel 58 that is not expected from autonomous control of the steering wheel 58 and is therefore indicative of manual intervention by the driver. In some embodiments, external torque applied to the steering wheel 58 may serve as a signal to the controller 38 that the driver has taken manual control and for the system 10 to discontinue autonomous steering functionality.

The controller 38 of the system 10 may also communicate with a vehicle brake control system 66 of the vehicle 12 to receive vehicle speed information such as individual wheel speeds of the vehicle 12. Additionally or alternatively, vehicle speed information may be provided to the controller 38 by a powertrain control system 68 and/or a vehicle speed sensor 70, among other conceivable means. In some embodiments, the controller 38 may provide braking commands to the vehicle brake control system 66, thereby allowing the system 10 to regulate the speed of the vehicle 12 during a backup maneuver of the vehicle 12. It should be appreciated that the controller 38 may additionally or alternatively regulate the speed of the vehicle 12 via interaction with the powertrain control system 68.

Through interaction with the power assist steering system 52, the vehicle brake control system 66, and/or the powertrain control system 68 of the vehicle 12, the potential for unacceptable backup conditions can be reduced when the vehicle 12 is backing toward the trailer 14. Examples of unacceptable backup conditions include, but are not limited to, a vehicle over-speed condition, sensor failure, and the like. In such circumstances, the driver may be unaware of the failure until the unacceptable backup condition is imminent or already happening. Therefore, it is disclosed herein that the controller 38 of the system 10 can generate an alert signal corresponding to a notification of an actual, impending, and/or anticipated unacceptable backup condition, and prior to driver intervention, generate a counter measure to prevent such an unacceptable backup condition.

According to one embodiment, the controller 38 may communicate with one or more devices, including a vehicle alert system 72, which may prompt visual, auditory, and tactile warnings. For instance, vehicle brake lights 74 and vehicle emergency flashers may provide a visual alert and a vehicle horn 76 and/or speaker 78 may provide an audible alert. Additionally, the controller 38 and/or vehicle alert system 72 may communicate with a human machine interface (HMI) 80 of the vehicle 12. The HMI 80 may include a touchscreen display 84 (FIG. 1) such as a center-stack mounted navigation or entertainment display capable of displaying images indicating the alert. Such an embodiment may be desirable to notify the driver of the vehicle 12 that an unacceptable backup condition is present. The touchscreen display 84 may also display one or more views based on images taken by the imaging device 40.

The controller 38 is configured with a microprocessor 85 and/or other analog and/or digital circuitry for processing one or more logic routines stored in a memory 86. The logic routines may include one or more operating routines 88. Information from the imaging device 40 or other components of the system 10 can be supplied to the controller 38 via a communication network of the vehicle 12, which can include a controller area network (CAN), a local interconnect network (LIN), or other known protocols used in the automotive industry. It should be appreciated that the controller 38 may be a stand-alone dedicated controller or may be a shared controller integrated with the imaging device 40 or other component of the system 10 in addition to any other conceivable onboard or off-board vehicle control systems.

According to one embodiment, the HMI 80 is configured to receive user-input specifying a target travel direction of the vehicle 12. In response, the controller 38 is configured to generate commands for autonomously maneuvering the vehicle 12 in the target travel direction. Typically, the target travel direction is rearward of the vehicle 12 and toward the trailer 14. However, it will be understood that the target travel direction is not necessarily limited to such, and may be toward another object or a point in space. During the autonomous maneuvering of the vehicle 12, the controller 38 is configured to identify a hitch coupler (e.g., coupler ball socket 26) of the trailer 14 based on input received from an object detection system, which may include the imaging device 40 and/or the proximity sensors 44 in addition to other suitable devices capable of detecting objects. If the hitch coupler is unable to be identified, the controller 38 may request additional user-input updating the target travel direction. Upon identifying the hitch coupler, the controller 38 is configured to update the target travel direction and autonomously maneuver the vehicle 12 toward the trailer 14 such that the tow hitch of the vehicle 12 is aligned with the hitch coupler of the trailer 14.

Figure 3:
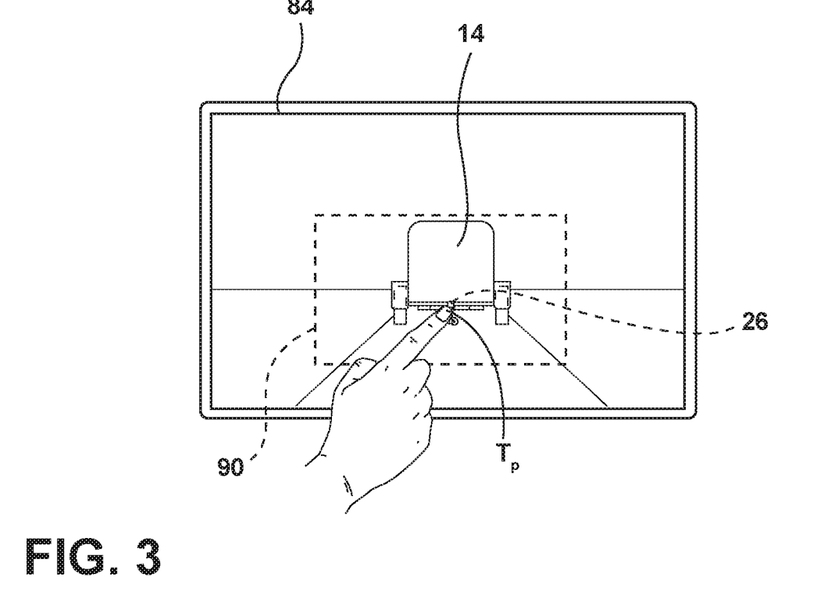
FIG. 3 illustrates a rear-vehicle view of the vehicle displayed on a touchscreen display configured register one or more touch events thereon for specifying the target travel direction of the vehicle.

Referring to FIG. 3, the touchscreen display 84 is configured to display a rear-vehicle view and register one or more touch events thereon for specifying the target travel direction of the vehicle 12. The rear-vehicle view may be generated from images captured by the imaging device 40. To specify the target travel direction of the vehicle 12, a user simply touches a point on the touchscreen display 84. The point, exemplarily shown as touchpoint $T_p$ may correspond to a point on the imaged trailer 14, a point on another imaged object, or a point in imaged space. In the depicted embodiment, the touchpoint $T_p$ corresponds to the coupler ball socket 26 of the imaged trailer 14. In some embodiments, the touchscreen display 84 is configured to generate a touch zone 90 indicating an allowable area in which to perform a touch event for specifying the target travel direction. The touch zone 90 is generated on a lower central region of the touchscreen display 84 where the imaged trailer 14 is predictably found.

Figure 4:
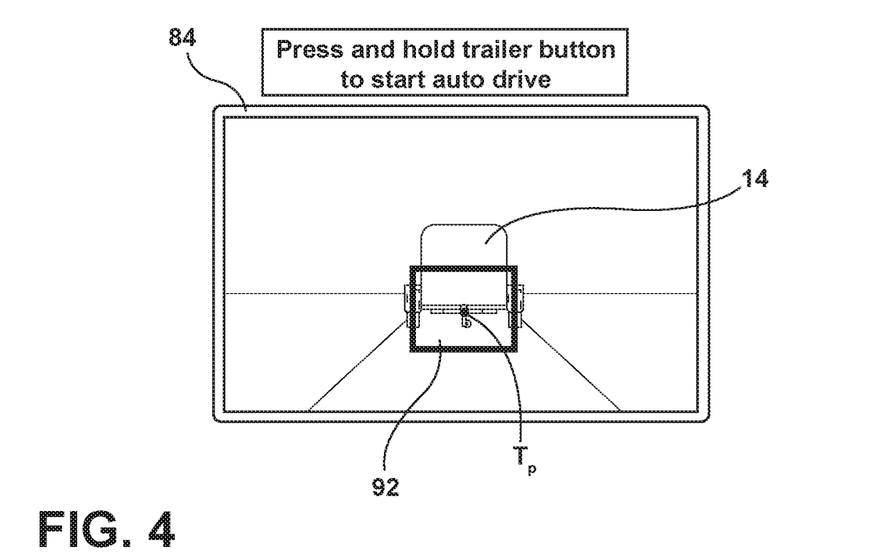
FIG. 4 illustrates an overlay generated on the touchscreen display, wherein a touch event on the overlay prompts a controller to autonomously maneuver the vehicle in the target travel direction.

Upon registering the touch event specifying the target travel direction of the vehicle 12, the touchscreen display 84 generates an overlay 92 exemplarily shown in FIG. 4 as a touch box encompassing touchpoint $T_p$. A subsequent touch event on the overlay 92 prompts the controller 38 to generate commands for autonomously maneuvering the vehicle 12 in the target travel direction. For example, the touch event may include touching the overlay 92 and maintaining touch therewith. So long as the user maintains touch with the overlay 92, the controller 38 may continue to generate commands for autonomously maneuvering the vehicle 12 in the target travel direction. To do so, the controller 38 may translate the touchpoint $T_p$ into a real world coordinate in order to implement autonomous maneuvering of the vehicle 12 in the target travel direction toward the real world coordinate of the touchpoint $T_p$.

Figure 5:
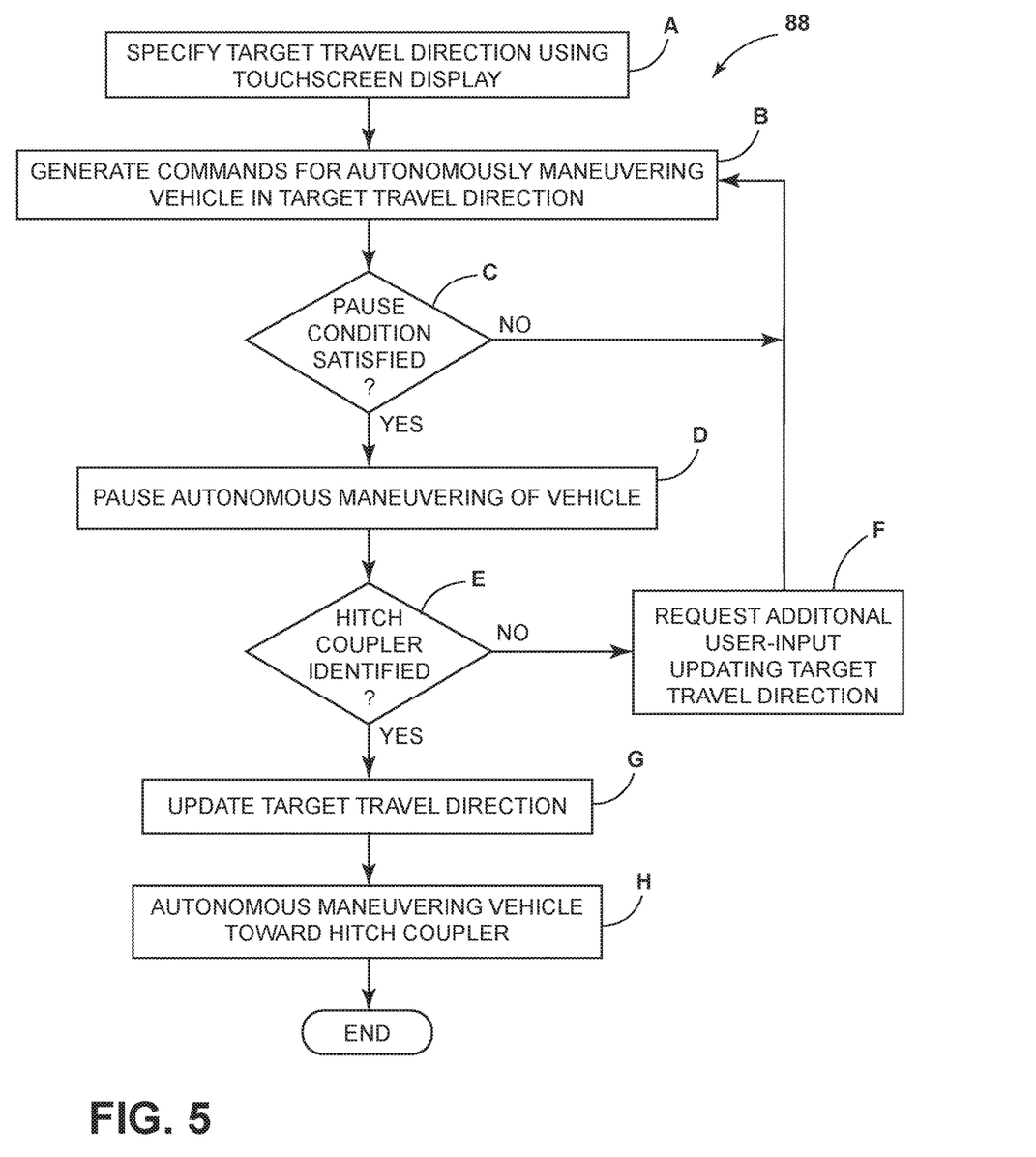
FIG. 5 is a flow diagram of a method of autonomously maneuvering a vehicle toward a trailer.
Figure 6:
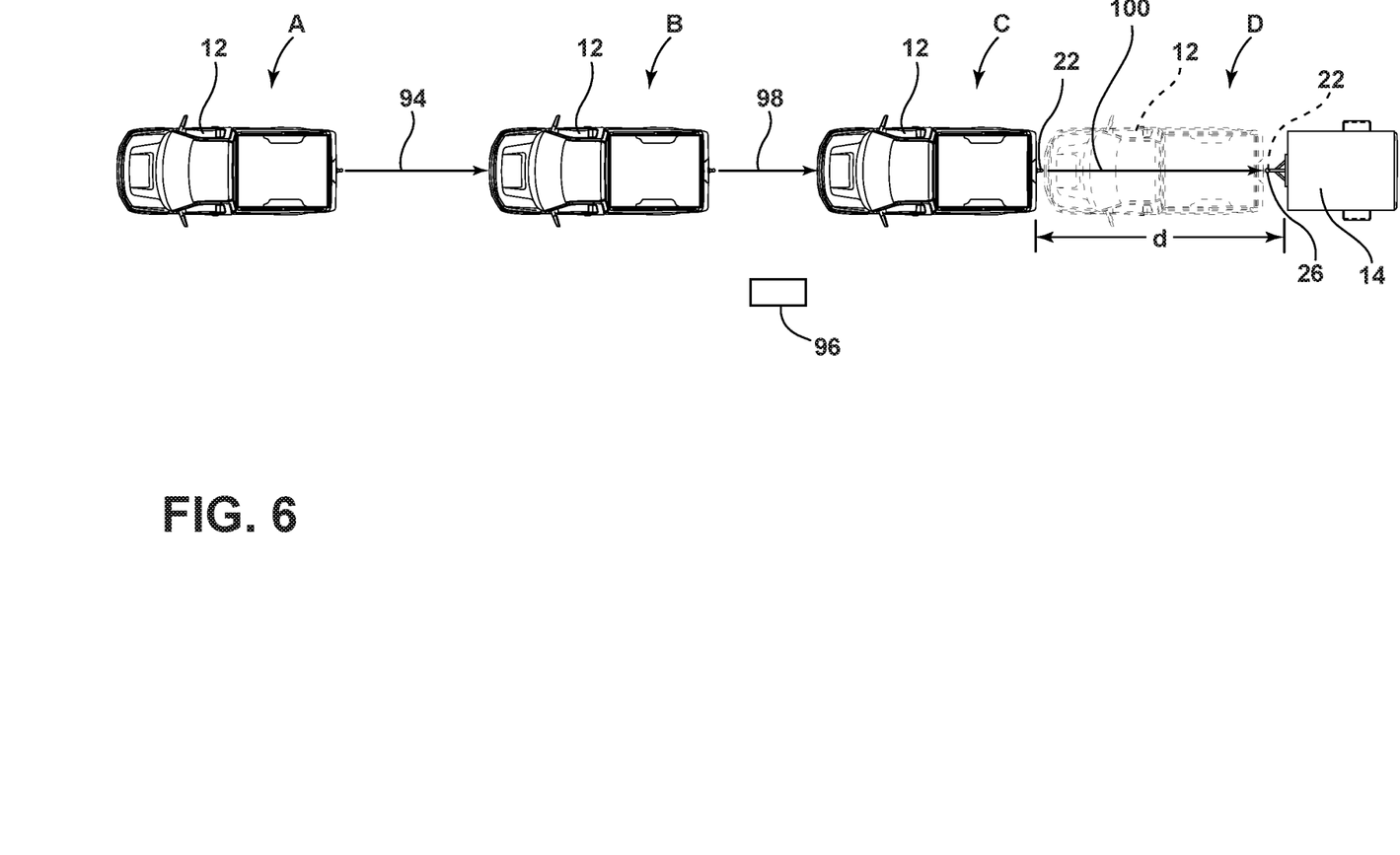
FIG. 6 illustrates an exemplary maneuver of the vehicle toward the trailer.

Referring to FIG. 5, an exemplary method autonomously maneuvering the vehicle 12 toward the trailer 14 is shown embodied as operating routine 88 of the controller 38. For purposes of understanding, the maneuver is described herein in relation to multiple stages shown as stages A-D in FIG. 6. At step A, a user specifies a target travel direction using the touchscreen display 84 as described herein. As shown in FIG. 6, step A may be executed at stage A and the target travel direction is generally represented by arrow 94. In the depicted embodiment, the target travel direction is generally straight and rearward of the vehicle 12. At step B, the controller 38 generates commands for autonomously maneuvering the vehicle 12 in the target travel direction.

While the vehicle 12 maneuvers in the target travel direction, the controller 38 routinely checks whether a pause condition is satisfied in step C. In the depicted embodiment, the pause condition is satisfied if the vehicle 12 reaches an end position in the target travel direction, the vehicle 12 travels a predetermined maximum distance in the target travel direction, or the detection system detects an object located at a predetermined distance rearward from the vehicle 12. As described herein, the end position may correspond to a real world coordinate translated from a user-supplied touchpoint such as touchpoint $T_p$ shown in FIGS. 3 and 4.

For example, as shown in FIG. 6, the pause condition is satisfied at stage B, where the detection system detects an object 96 rearward of the vehicle 12. As described herein, the object 96 may be detected by the proximity sensors 44 and/or the imaging device 40. In the depicted embodiment, the object 96 corresponds to a non-trailer object and may be fixed or moving. Upon satisfaction of the pause condition, the controller 38 pauses autonomous maneuvering of the vehicle 12 at step D, or in other words, generates commands for stopping the vehicle 12. If the controller 38 is unable to identify a hitch coupler at step E, the controller 38 requests additional user-input updating the target travel direction of the vehicle 12 at step F. For example, the controller 38 may request the user to specify a new target travel direction or confirm the current target travel direction. To update the target travel direction, the user may perform one or more touch events as described herein.

In some scenarios, the user may be required to specify a new target travel direction if the object 96 obstructs the vehicle 12 from being maneuvered in the current target travel direction. In other scenarios, a new target travel direction may be required if the vehicle 12 has reached the end position in the target travel direction or the vehicle 12 has traveled a maximum distance in the target travel direction. In any event, once the target travel direction is updated, the controller 38 returns to step B to generate commands for autonomously maneuvering the vehicle 12 in the target travel direction. As exemplarily shown in FIG. 6, the controller 38 autonomously maneuvers the vehicle 12 in the updated target travel direction generally represented by arrow 98. In the depicted embodiment, the updated target travel direction is approximately the same as that specified at stage A but may be different if desired.

At stage C, the controller 38 pauses the autonomous maneuvering of the vehicle 12 subsequent to detection of the trailer 14 at a predetermined distance d rearward of the vehicle 12. Upon identifying the hitch coupler at step E, the controller 38 updates the target travel direction of the vehicle 12 at step G. To identify the hitch coupler, the controller 38 may process images captured by the imaging device 40. For example, the controller 38 may employ edge detection or match the hitch coupler to a template stored in memory 86. It is contemplated that one or more templates may be stored to memory 86 and may be called upon for the specific trailer 14. The updated target travel direction is generally represented by arrow 100 and may differ slightly than that represented by arrow 98 as a result of the controller 38 fine tuning the target travel direction once the hitch coupler is identified.

Figure 7:
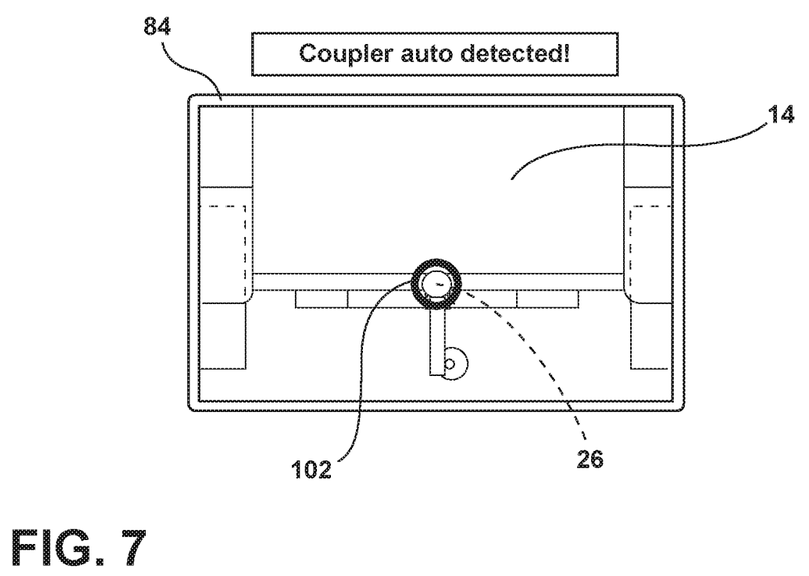
FIG. 7 illustrates an overlay generated on the touchscreen display and coinciding with an identified hitch coupler of the trailer.

Having identified the hitch coupler, the controller 38 generates commands for autonomously maneuvering the vehicle 12 toward the hitch coupler (e.g., coupler ball socket 26) in order to align a tow hitch (e.g., hitch ball 22) therewith at step H. In some embodiments, the controller 38 requests user-input confirming the identification of the hitch coupler prior to performing steps G or H. For example, as shown in FIG. 7, the touchscreen display 84 may generate an overlay 102 that coincides with the identified hitch coupler and the user may confirm its identification by simply touching the overlay 102 and maintaining touch therewith to prompt the controller 38 to generate the commands for autonomously maneuvering the vehicle 12 toward the hitch coupler. So long as the user maintains touch with the overlay 102, autonomous maneuvering of the vehicle 12 may continue toward the hitch coupler. As shown in stage D in FIG. 6, the hitch ball 22 of the vehicle 12 is aligned with the coupler ball socket 26 of the trailer 14. In such a scenario, the controller 38 ends autonomous maneuvering of the vehicle 12 and the user is able to hitch the trailer 14 to the vehicle 12.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A hitch assist system comprising:
   a human machine interface configured to receive user-input specifying a target travel direction of a vehicle; and
   a controller configured to:
      receive a first user input specifying a first target direction of the vehicle, generate commands for autonomously maneuvering the vehicle in the target travel direction and to control vehicle steering and braking systems to move the vehicle according to the commands;
      attempt to identify a hitch coupler of a trailer based on input received from an object detection system while controlling the vehicle steering and braking systems to move the vehicle; and
      request a second user-input updating the target travel direction if the controller is unable to identify the coupler of the trailer based on the first user input.

2. The hitch assist system of claim 1, wherein the human machine interface comprises a touchscreen display configured to display a rear-vehicle view and register one or more touch events thereon for specifying the target travel direction of the vehicle.

3. The hitch assist system of claim 2, wherein the touchscreen display generates an overlay corresponding with the user input once the target travel direction is specified, and wherein the controller controls the vehicle steering and braking systems to move the vehicle according to the commands in response to on a touch event on the overlay.

4. The hitch assist system of claim 3, wherein the touch event comprises touching the overlay and maintaining touch therewith.

5. The hitch assist system of claim 1, wherein the object detection system comprises at least one of a rear-vehicle camera and one or more proximity sensors comprising at least one of an ultrasonic sensor, a radar sensor, a laser sensor, and a LIDAR sensor.

6. The hitch assist system of claim 1, wherein the controller generates commands for stopping the vehicle if a pause condition is satisfied.

7. The hitch assist system of claim 6, wherein the pause condition is satisfied if the vehicle reaches an end position in the target travel direction.

8. The hitch assist system of claim 6, wherein the pause condition is satisfied if the vehicle travels a predetermined maximum distance in the target travel direction without identifying the hitch coupler of the trailer.

9. The hitch assist system of claim 6, wherein the pause condition is satisfied if the object detection system detects an object located at a predetermined distance rearward from the vehicle.

10. The hitch assist system of claim 1, wherein upon identifying the hitch coupler, the controller updates the target travel direction of the vehicle and generates commands for autonomously maneuvering the vehicle toward the hitch coupler in order to align a tow hitch of the vehicle therewith.

11. The hitch assist system of claim 10, wherein prior to updating the target travel direction of the vehicle, the controller requests user-input confirming the identification of the hitch coupler.

12. The hitch assist system of claim 1, wherein the additional user-input updating the target travel direction comprises user-input specifying a new target travel direction or user-input confirming a current target travel direction.

13. A hitch assist system of a vehicle, comprising:
a touchscreen display configured to display a rear-vehicle view and register one or more touch events thereon for specifying a target travel direction of the vehicle, the one or more touch events comprising touching a point on the touchscreen display; and
a controller configured to:
translate the point into a real world coordinate and generate commands for autonomously maneuvering the vehicle in the target travel direction toward the real world coordinate of the point through an initial travel distance prior to identifying any portion of a trailer, including a hitch coupler thereof;
while maneuvering the vehicle in the target travel direction through the initial travel distance:
attempting to identify the hitch coupler of the trailer; and
identifying the hitch coupler of the trailer based on the real world coordinate of the point and an input received from an object detection system determining a location of the identified coupler relative to the vehicle; and
maneuvering the vehicle through a final travel distance to align a coupler of the vehicle with the location of the identified coupler.

14. The hitch assist system of claim 13, wherein the touchscreen display is configured to generate a touch zone indicating an allowable area in which to perform a touch event for specifying the target travel direction.

15. The hitch assist system of claim 14, wherein the touch zone is generated on a lower central region of the touchscreen display where an imaged trailer is predictably found.

16. The hitch assist system of claim 13, wherein the touchscreen display generates an overlay encompassing the touchpoint and the controller autonomously maneuvers the vehicle in the target travel direction in response to a touch event on the overlay.

17. The hitch assist system of claim 16, wherein:
the touch event comprises touching the overlay and maintaining touch therewith; and
so long as touch is maintained with the overlay, the controller continues to generate commands for autonomously maneuvering the vehicle in the target travel direction.

18. The hitch assist system of claim 13, wherein the controller generates commands for stopping the vehicle if a pause condition is satisfied, and wherein the pause condition is satisfied if the vehicle reaches an end position in the target travel direction, the vehicle travels a predetermined maximum distance in the target travel direction, or an object is detected at a predetermined distance rearward from the vehicle.

19. The hitch assist system of claim 13, wherein the controller is further configured to request a second touch event updating the target travel direction, if the controller is unable to identify the coupler of the trailer based on the touch event when reaching an end of the initial travel distance.

20. A method comprising the steps of:
receiving a first user-input specifying a target travel direction of a vehicle on a human machine interface;
attempting to identify a hitch coupler of a trailer based on the first user-input;
generating commands for autonomously maneuvering the vehicle in the target travel direction and controlling vehicle steering and braking systems to move the vehicle according to the commands;
attempting to identify the hitch coupler of the trailer based on input received from an object detection system while controlling the vehicle steering and braking systems to move the vehicle; and
requesting a second user-input updating the target travel direction if no hitch coupler is identified during the steps of attempting to identify the hitch coupler.

\* \* \* \* \*